United States Patent
Jo et al.

(10) Patent No.: US 10,677,681 B2
(45) Date of Patent: Jun. 9, 2020

(54) INSPECTION METHOD AND APPARATUS FOR TESTING CAP SEALING OF CONTAINER THAT INVOLVES CALCULATING SURFACE TEMPERATURE OF TEMPERATURE SENSOR AND COMPARING DIFFERENCE BETWEEN MEASURED TEMPERATURE AND THE CALCULATED TEMPERATURE WITH THRESHOLD FOR CORRECTING THERMAL IMAGE DATA

(71) Applicant: COGLIX CO. LTD., Hanam-si, Gyeonggi-do (KR)

(72) Inventors: Seoung Je Jo, Gyeonggi-do (KR); Jae Hun Park, Gyeonggi-do (KR); Boo Han Lee, Seoul (KR)

(73) Assignee: COGLIX CO. LTD., Hanami-si, Gyeonggi-do (KR)

(*) Notice: Subject to any disclaimer, the term of this patent is extended or adjusted under 35 U.S.C. 154(b) by 89 days.

(21) Appl. No.: 15/306,337

(22) PCT Filed: Oct. 19, 2016

(86) PCT No.: PCT/KR2016/011737
§ 371 (c)(1),
(2) Date: Apr. 20, 2018

(87) PCT Pub. No.: WO2018/074621
PCT Pub. Date: Apr. 26, 2018

(65) Prior Publication Data
US 2019/0195724 A1 Jun. 27, 2019

(51) Int. Cl.
*G01M 3/38* (2006.01)
*G01J 5/10* (2006.01)
*H04N 17/00* (2006.01)
*H04N 5/33* (2006.01)
(Continued)

(52) U.S. Cl.
CPC ............... *G01M 3/38* (2013.01); *G01J 5/10* (2013.01); *G01J 5/20* (2013.01); *G01J 5/48* (2013.01); *H04N 5/33* (2013.01); *H04N 17/002* (2013.01)

(58) Field of Classification Search
CPC ...... G01J 5/10; G01J 5/20; G01J 5/48; G01M 3/38; H04N 17/002; H04N 5/33
See application file for complete search history.

(56) References Cited

U.S. PATENT DOCUMENTS

| | | | |
|---|---|---|---|
| 2003/0062671 A1* | 4/2003 | Yasui | B65H 1/26 271/270 |
| 2010/0236743 A1* | 9/2010 | Xie | B22D 2/00 164/4.1 |
| 2013/0141590 A1 | 6/2013 | Matsumoto | |

(Continued)

FOREIGN PATENT DOCUMENTS

| JP | 2003307505 A | * 10/2003 |
|---|---|---|
| JP | 2003307505 A | 10/2003 |

(Continued)

*Primary Examiner* — Francis Geroleo
(74) *Attorney, Agent, or Firm* — Nathan P. Letts; Olive Law Group, PLLC

(57) ABSTRACT

In an inspection method and apparatus, when an infrared (IR) image is obtained by using an IR camera and thermal image data corresponding to the obtained IR image is stored or inspected, confidence of the thermal image data is improved.

9 Claims, 8 Drawing Sheets

(51) Int. Cl.
*G01J 5/48* (2006.01)
*G01J 5/20* (2006.01)

(56) References Cited

U.S. PATENT DOCUMENTS

2014/0270563 A1* 9/2014 Bailey .................... G06T 5/005
                                                                      382/254
2014/0311256 A1   10/2014 Cochran et al.
2016/0295206 A1*  10/2016 Tanaka .................. H04N 5/361
2019/0014990 A1*   1/2019 Franz .................... G01J 5/522

FOREIGN PATENT DOCUMENTS

| JP | 2012225728 A |   | 11/2012 |
| JP | 2013118547 A |   | 6/2013  |
| KR | 1020000031313 A | | 6/2000 |
| KR | 1020020015517 A | | 2/2002 |
| KR | 20050009060 A | * | 1/2005 |
| KR | 20050009060 A |   | 1/2005 |
| KR | 100661794 B1 |   | 12/2006 |
| KR | 1020150022249 A | | 3/2015 |
| KR | 101643713 B1 |   | 8/2016 |

* cited by examiner

INSPECTION METHOD AND APPARATUS FOR TESTING CAP SEALING OF CONTAINER THAT INVOLVES CALCULATING SURFACE TEMPERATURE OF TEMPERATURE SENSOR AND COMPARING DIFFERENCE BETWEEN MEASURED TEMPERATURE AND THE CALCULATED TEMPERATURE WITH THRESHOLD FOR CORRECTING THERMAL IMAGE DATA

RELATED APPLICATIONS

This application is the national stage under 35 U.S.C. § 371 of International Application No. PCT/KR2016/011737, filed Oct. 19, 2016, the content of which is incorporated by reference herein in its entirety.

TECHNICAL FIELD

The present invention relates to an inspection method and apparatus, and more particularly, to a method and apparatus for inspecting cap sealing of a container transferred along a process line by using an infrared (IR) camera.

BACKGROUND ART

Induction sealing, which is known as cap sealing, is a non-contact method of heating a metallic disk to hermetically seal the top of plastic and glass containers. This sealing process takes place after the container has been filled, for example, tablets, and capped. A closure is supplied to a bottler with an aluminum foil liner already inserted. A typical induction liner is multilayered. The top layer spaced apart from an opening of the container is generally a paper pulp that is generally spot-glued to the cap. The next layer is wax that is used to bond a layer of aluminum foil to the pulp. The bottom layer is a polymer film laminated to the foil. In existing capping technologies, after the cap or closure is applied to the opening of container, the container passes under an induction coil that emits an oscillating electromagnetic field. As the container passes under the induction coil, the conductive aluminum foil liner begins to heat. The heat melts the wax, which is absorbed into the pulp backing and releases the foil from the cap. The polymer film also heats and flows onto the lip of the container. When cooled, the polymer creates a bond with the container resulting in a hermetically sealed product. While neither the container nor its contents are negatively affected, this process is performed within a few seconds or faster. It is possible to overheat the foil causing damage to the seal layer or any protective barriers. This could result in faulty seals, even weeks after the initial sealing process, In order to detect a defect in sealing, various thermography based systems have been suggested and the systems are most based on processing of thermal image data of cap sealing photographed by an infrared (IR) camera or IR imaging camera.

The IR camera or IR imaging camera detects energy of an IR wavelength range and converts the energy to an image. All objects emit an IR ray and an object having a higher temperature emits a larger amount of IR. Accordingly, an IR image may be understood to be a thermal image.

The IR camera may include a cooled type and an uncooled type. Generally, the cooled type IR camera is sensitive to a wavelength range of about 1 µm to about 5 µm and the uncooled IR camera is sensitive to a wavelength range of about 7 µm to about 13 µm. Factory calibration of an IR camera is performed by a manufacturer. In this process, the IR camera has a calibration table or a calibration file suitable for a particular temperature range.

When an appropriate calibration value is not loaded, incorrect temperature data is read. When a sudden temperature change of an external environment occurs, the temperature of an object to be photographed is changed. The physical quantity of temperature has the following properties. Even when a temperature value changes as a temperature environment is rapidly changed, the temperatures of objects in the environment are relatively slowly affected, compared to the temperature of the atmosphere, and the temperatures of the objects are changed. When the IR camera is in error, data is read and presented in an image, showing a different value from an actual temperature. These properties are important problems in the IR camera based image photographing performed through observation of thermal energy.

DETAILED DESCRIPTION OF THE INVENTION

Technical Problem

The present invention provides an inspection method and apparatus, which may improve confidence of thermal image data when an infrared (IR) image is obtained by using an IR camera and the thermal image data corresponding to the obtained IR image is stored or inspected.

Furthermore, the present invention provides an inspection method and apparatus, which may notify a user of an abnormal operation of an IR camera, a case of exceeding a calibration temperature range of an IR camera, or a case in which the current situation is inappropriate for an inspection in an inspection system using an IR camera.

Technical Solution

According to an aspect of the present invention, there is provided a method of inspecting cap sealing of a container transferred along a process line by using an infrared (IR) camera, the method including measuring a temperature by using a temperature sensor located within a field of view (FOV) of the IR camera, calculating a surface temperature of the temperature sensor based on thermal image data of the temperature sensor photographed by the IR camera, comparing a difference value between a first value measured by the temperature sensor and a second value that is calculated, with a certain threshold value, and correcting the thermal image data corresponding to the cap sealing of the container obtained by the IR camera based on the measured first value.

The method may further include outputting a notification corresponding to a rapid temperature change through a display portion of an apparatus when the difference value between the first value and the second value is greater than the certain threshold value.

The method may further include outputting a notification indicating that a state of the IR camera is abnormal through a display portion of an apparatus when the difference value between the first value and the second value is greater than the certain threshold value.

The method may further include outputting a notification indicating that a correction range of the IR camera is exceeded through a display portion of an apparatus when the difference value between the first value and the second value is greater than the certain threshold value.

The certain threshold value may be differently set according to whether the IR camera is a cooled type or an uncooled type.

The certain threshold value may be differently set according to accuracy and range of correction of the IR camera.

The certain threshold value may be differently set according to noise equivalent temperature difference of the IR camera.

The certain threshold value may be a value between about 0.01 and about 5.0 in terms of Celsius temperature.

According to an aspect of the present invention, there is provided a non-transitory computer readable storage medium having stored thereon a program, which when executed by a computer, performs the method of inspecting cap sealing of a container transferred along a process line by using an infrared (IR) camera, the method including measuring a temperature by using a temperature sensor located within a field of view (FOV) of the IR camera, calculating a surface temperature of the temperature sensor based on thermal image data of the temperature sensor photographed by the IR camera, comparing a difference value between a first value measured by the temperature sensor and a second value that is calculated, with a certain threshold value, and correcting the thermal image data corresponding to the cap sealing of the container obtained by the IR camera based on the measured first value.

According to an aspect of the present invention, there is provided an apparatus for inspecting cap sealing of a container transferred along a process line by using an infrared (IR) camera, the apparatus including the IR camera photographing the cap sealing of the container, a temperature sensor located within a field of view (FOV) of the IR camera and measuring a temperature, and a controller calculating a surface temperature of the temperature sensor based on thermal image data of the temperature sensor photographed by the IR camera, comparing a difference value between a first value measured by the temperature sensor and a second value that is calculated, with a certain threshold value, and correcting the thermal image data corresponding to the cap sealing of the container obtained by the IR camera based on the measured first value.

The temperature sensor may be located within the FOV by being connected to a support member that extends downwardly from a position adjacent to the IR camera.

The apparatus may further include a display portion that displays the thermal image data obtained by photographing the cap sealing of the container and the thermal image data of the temperature sensor, in which, when the difference value between the first value and the second value is greater than the certain threshold value, the controller outputs through the display portion a notification corresponding to a rapid temperature change, a notification indicating that a state of the IR camera is abnormal, or a notification indicating that a correction range of the IR camera is exceeded.

The certain threshold value may be differently set according to whether the IR camera is a cooled type or an uncooled type, accuracy and range of correction of the IR camera, or noise equivalent temperature difference of the IR camera.

The certain threshold value may be a value between about 0.01 and about 5.0 in terms of Celsius temperature.

Advantageous Effects

The inspection method and apparatus according to an embodiment may improve confidence of thermal image data when an infrared (IR) image is obtained by using an IR camera and the thermal image data corresponding to the obtained IR image is stored or inspected.

Furthermore, the present invention provides an inspection method and apparatus, which may notify a user of an abnormal operation of an IR camera, a case of exceeding a calibration temperature range of an IR camera, or a case in which the current situation is inappropriate for an inspection in an inspection system using an IR camera.

BEST MODE

Figure 1:
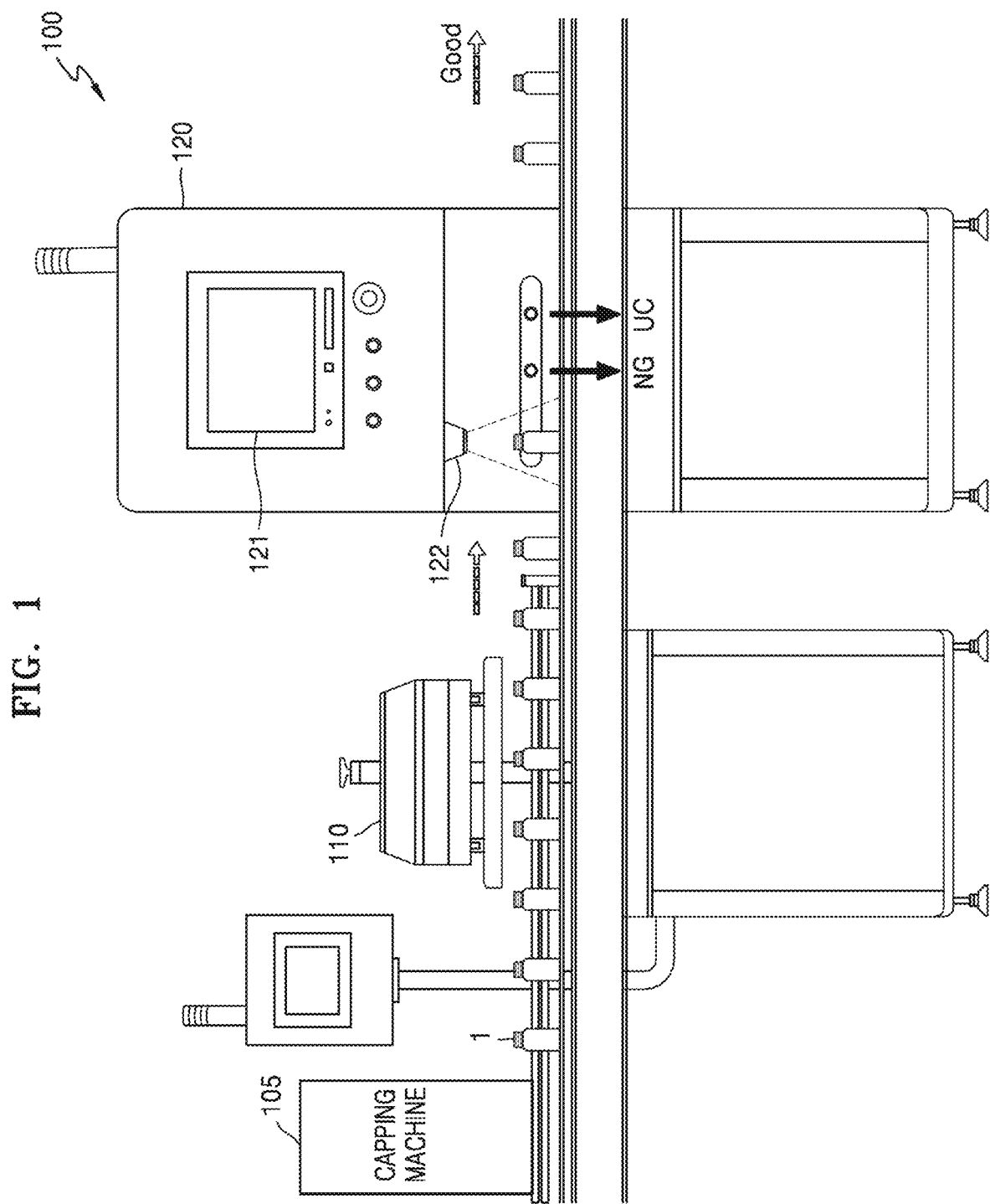
FIG. 1 is a schematic view of an overall system according to an embodiment.

As the inventive concept allows for various changes and numerous embodiments, embodiments will be illustrated in the drawings and described in detail in the written description. However, this is not intended to limit the present inventive concept to particular modes of practice, and it is to be appreciated that various modifications, equivalents, and/or alternatives that do not depart from the spirit and technical scope of the present inventive concept are encompassed in the present inventive concept. Like reference numerals refer to like elements throughout the specification regarding the description of the drawings.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the present specification, the expressions such as "A or B," "at least one of A and/or B," or "at least one or more of A and/or B" may include all available combinations of items listed together. For example, the expressions such as "A or B," "at least one of A and B," or "at least one of A or B" may signify all cases of (1) including at least one A, (2) including at least one B, or (3) including both of at least one A and at least one B.

Terms such as "first" and "second" are used herein merely to describe a variety of constituent elements regardless of an order and/or importance and to distinguish one constituent element from another constituent element, but the constituent elements are not limited by the terms. For example, a first user device and a second user devise may denote different user devices regardless of an order and/or importance. For example, without departing from the right scope of the present inventive concept, a first constituent element may be referred to as a second constituent element, and vice versa.

In the present specification, when a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element. Conversely, when a constituent element, e.g., a first constituent element, is described to "directly connect" or to be "directly connected" to another constituent element, e.g., a second constituent element, the constituent element should be construed to be directly connected to another constituent element without any other constituent element, e.g., a third constituent element, interposed therebetween. Other expressions, such as, "between" and "directly between", describing the relationship between the constituent elements, may be construed in the same manner.

In the present specification, the expression "configured to" may be interchangeable with an expression such as "suitable for", "having the capacity to", "designed to", "adapted to", "made to", or "capable of". The expression "configured to" does not necessarily signify one that is "specifically designed to" in hardware. Instead, in some situations, the expression "configured to" may signify one that is "capable of" performing a function with other device or parts. For example, an expression "a processor configured to perform functions A, B, and C" may signify an exclusive processor, for example, an embedded processor, for performing the functions or a generic-purpose processor, for example, a central processing unit (CPU) or an application processor (AP), capable of performing the functions by executing one or more software programs stored in a memory device.

The terms used in the present inventive concept have been selected from currently widely used general terms in consideration of the functions in the present inventive concept. However, the terms may vary according to the intention of one of ordinary skill in the art, case precedents, and the advent of new technologies. Also, for special cases, meanings of the terms selected by the applicant are described in detail in the description section. Accordingly, the terms used in the present inventive concept are defined based on their meanings in relation to the contents discussed throughout the specification, not by their simple meanings.

FIG. 1 is a schematic view of an overall system 100 according to an embodiment.

Referring to FIG. 1, the overall system 100 may include a capping machine 105 for attaching a cap on a container 1 that is transferred along a process line, a sealing machine 110 for hermetically sealing the cap that is attached or placed on the container 1, and an inspection apparatus 120 for inspecting cap sealing of the transferred container. The inspection apparatus 120 according to the present embodiment may include a display or display portion 121 and an infrared (IR) camera 122. The inspection apparatus 120 may further include a multi-rejection structure that allows the container 1 determined to be a good product to continuously proceed along the process line, separately collects the container 1 determined to be a not good product in a collection box corresponding to Not Good (NG), and separately collects the container 1 determined to be a user check product in a collection box corresponding to User Check (UC).

The good product, the not good product, and the user check product are determined by previously learning cap sealing of the container 1 according to the types of a good product and a not good product and, during an actual inspection, comparing thermal image data of the container 1 photographed by the IR camera 122 with the previously learned data, thereby classifying the products into the good product and the not good product. Furthermore, when the above operation is performed based on data learned by using machine learning, the operation may be expressed by confidence points and the good product, the not good product, and the user check product are determined based on a predefined confidence value range. In other words, as a result of analysis of thermal image data of a current inspection product, when the confidence value thereof is greater than the maximum confidence value, the current inspection product is determined to be a good product, when the confidence value thereof is less than the minimum confidence value, the current inspection product is determined to be a not good product, and when the confidence value thereof is between the maximum confidence value and the minimum confidence value, the current inspection product is determined to be a user check product. In other words, when the confidence value is ambiguous, the current inspection product is separately classified to be processed by user check, rather than forcedly determined to be a good product or a not good product with a low confidence.

Furthermore, the inspection apparatus 120 according to the present embodiment may predict inspection accuracy of cap sealing of a particular container through a setting process, before performing an actual inspection. For example, the predicted inspection accuracy may be notified to a user by predicting the inspection accuracy according to a result of the previous learning based on the types of a good product and a not good production.

The capping machine 105 places a cap on the container 1 transferred along the process line. The sealing machine 110 may be a high frequency heat inducing (HFHI) unit.

The container 1 passing through the sealing machine 110 is transferred to the inspection apparatus 120 and is located within a field of view (FOV) of the IR camera 122. Under the control of the inspection apparatus 120, the cap sealing of the container 1 is photographed by the IR camera 122, the photographed cap sealing is image-processed to generate thermal image data, and the thermal image data is displayed on the display portion 121. Furthermore, the inspection apparatus 120 compares the thermal image data with the previously learned data and determines whether the cap sealing corresponding to the thermal image data is a good product, a not good product, or a user check product. Furthermore, even when the cap sealing is determined to be a not good product, the inspection apparatus 120 may display on the display portion 121 a type of defect, for example, Overheat, Loosen, Damaged seal, or Underheat. Accordingly, it is possible to check in which process line of the entire process of the cap sealing of a container, for example, the capping machine 105 or the sealing machine 110, an error occurred.

To increase confidence of the IR camera 122 according to a temperature change, the inspection apparatus 120 according to the present embodiment may locate a temperature sensor within the FOV of the IR camera 122, perform a comparison operation between a value of the temperature sensor and a temperature value calculated from thermal image data obtained by photographing the temperature sensor, and notify a user of temperature calibration and inspection environment of the IR camera 122. The above configuration is described below with reference to FIGS. 2 and 3.

Figure 2:
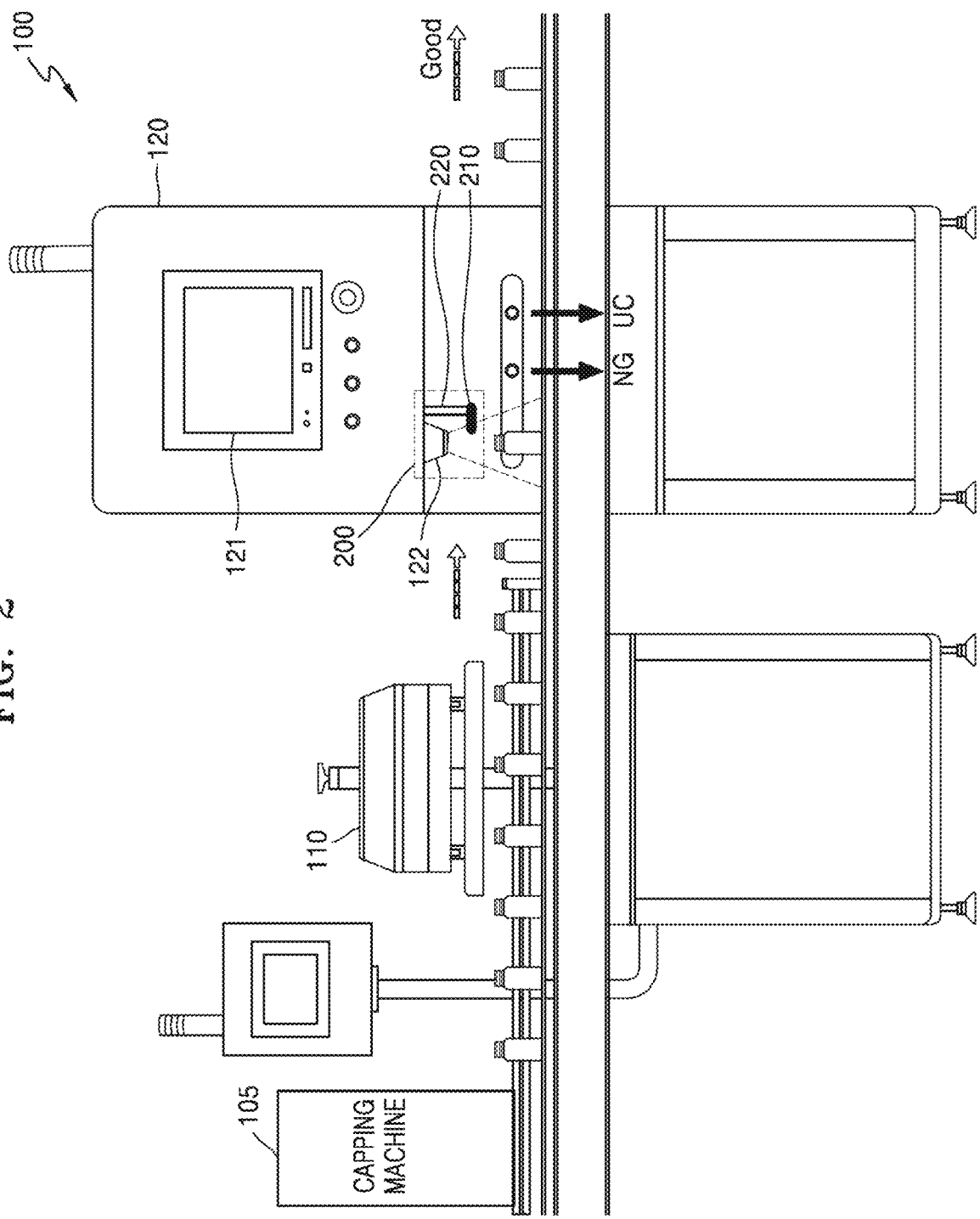
FIGS. 2 and 3 are schematic views of an inspection apparatus of FIG. 1.
Figure 3:
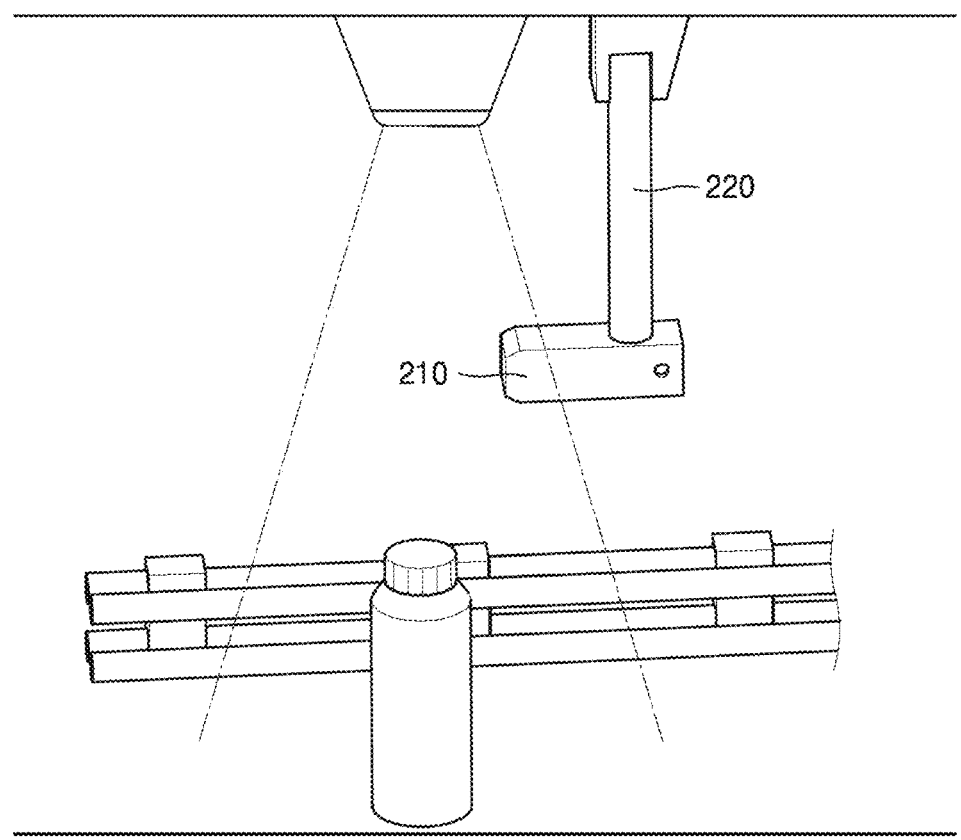

FIGS. 2 and 3 are schematic views of the inspection apparatus 120 of FIG. 1.

Referring to FIGS. 2 and 3, a temperature sensor 210 is located within an FOV 200 of the IR camera 122. The temperature sensor 210 is supported by a support member 220 extending downwardly to be adjacent to the IR camera 122. The temperature sensor 210 may include a thermocouple, a resistance temperature detector (RTD) sensor, and a thermister.

The IR camera 122 may be a cooled type or an uncooled type, but not limited thereto. A cooled type IR camera may include thermoelectric cooling (TE Type), Stirling cooling (closed cycle cooling), argon gas cooling, liquid nitrogen cooling (LN2) according to a cooling method, but not limited thereto. The cooled type IR camera is generally sensitive to a wavelength range of about 1 μm to about 5 μm.

An uncooled type IR camera may be a microbolometric sensor, which is a sensor requiring no cooling at all, and may have merits of the same performance, low power consumption, and no maintenance and repair required. The uncooled type IR camera is generally sensitive to a wavelength range of about 7 μm to about 13 μm.

Figure 4:
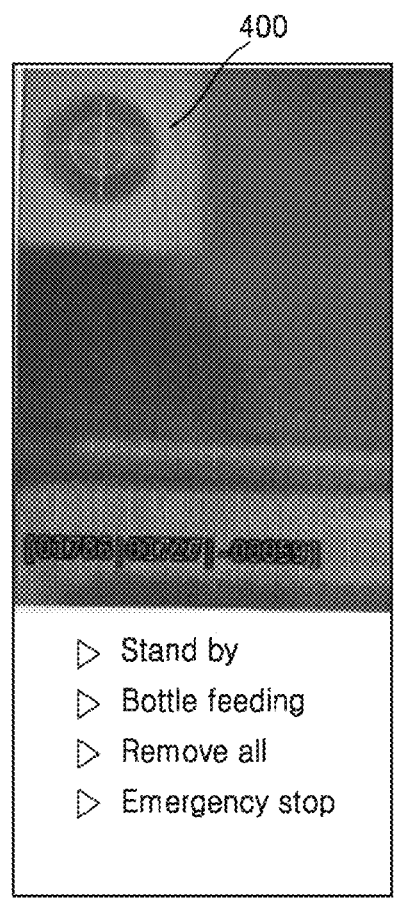
FIG. 4 is an exemplary view of thermal image data indicating a temperature sensor photographed by an infrared (IR) camera.
Figure 5:
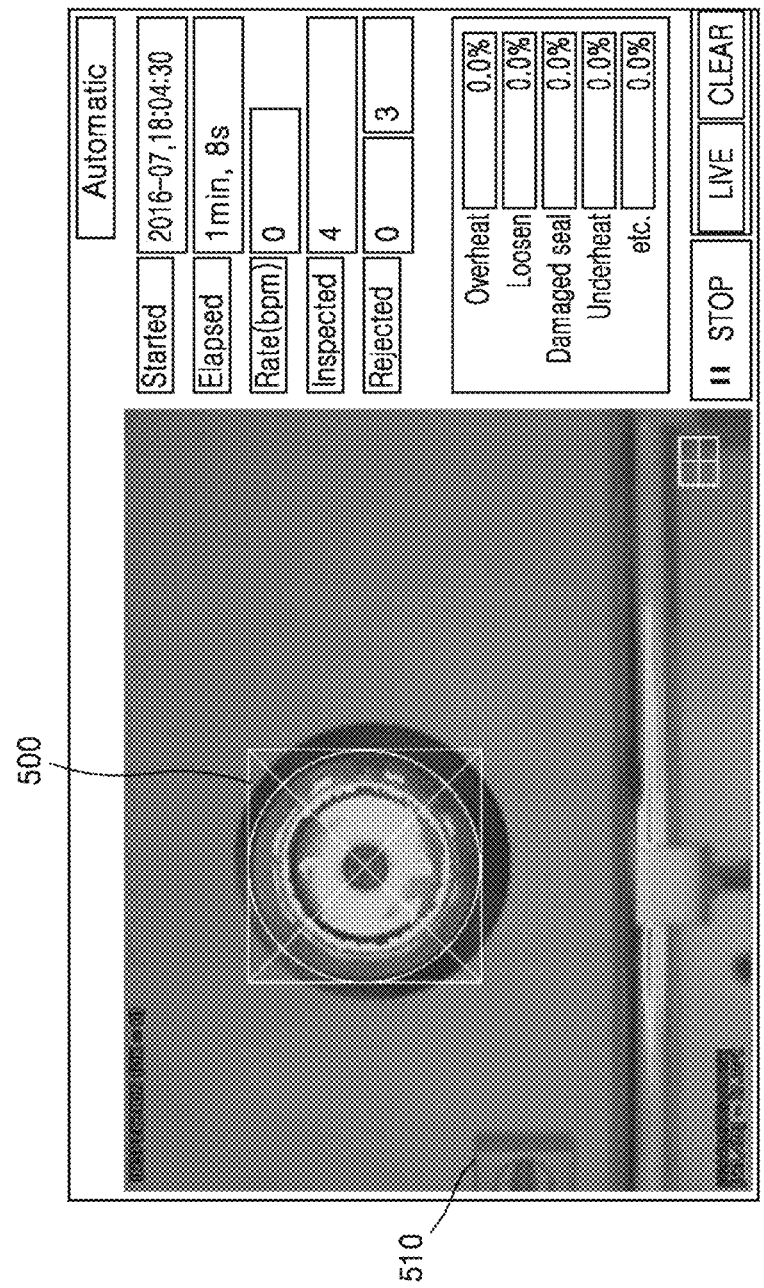
FIG. 5 is an exemplary view of thermal image data of cap sealing photographed by the IR camera.

FIG. 4 is an exemplary view of thermal image data indicating the temperature sensor 210 photographed by the IR camera 122. FIG. 5 is an exemplary view of thermal image data of cap sealing photographed by the IR camera 122.

Referring to FIG. 4, an image 400 indicating thermal image data obtained by photographing the temperature sensor 210 located within the FOV of the IR camera 122 is illustrated.

Referring to FIG. 5, a thermal image data 500 obtained by photographing cap sealing of the container 1 and a thermal image data 510 obtained by photographing the temperature sensor 210 are displayed on the display portion 121 of the inspection apparatus 120.

The inspection apparatus 120 according to the present embodiment compares a temperature value measured by the temperature sensor 210 with a temperature value based on the thermal image data 510 of the temperature sensor 210 photographed by the IR camera 122, and corrects the thermal image data 500 obtained by photographing the cap sealing of the container 1 based on a result of the comparison. Furthermore, when a difference between the measured temperature value and the calculated temperature value is greater than a certain threshold value, the inspection apparatus 120 may display on the display portion 121 a notification of generation of a rapid temperature change, a notification of the IR camera 122 being in an abnormal state, or a notification of excess of a calibration range or a correction range of the IR camera 122.

Accordingly, a user or an operator of the inspection apparatus 120 may not only recognize that accuracy of inspection is possibly lowered due to a current operation environment of the inspection apparatus 120, but also improve confidence of the inspection apparatus 120 by operating the inspection apparatus 120 by waiting until the temperature difference is within a certain range or the temperature values match each other to a degree.

Figure 6:
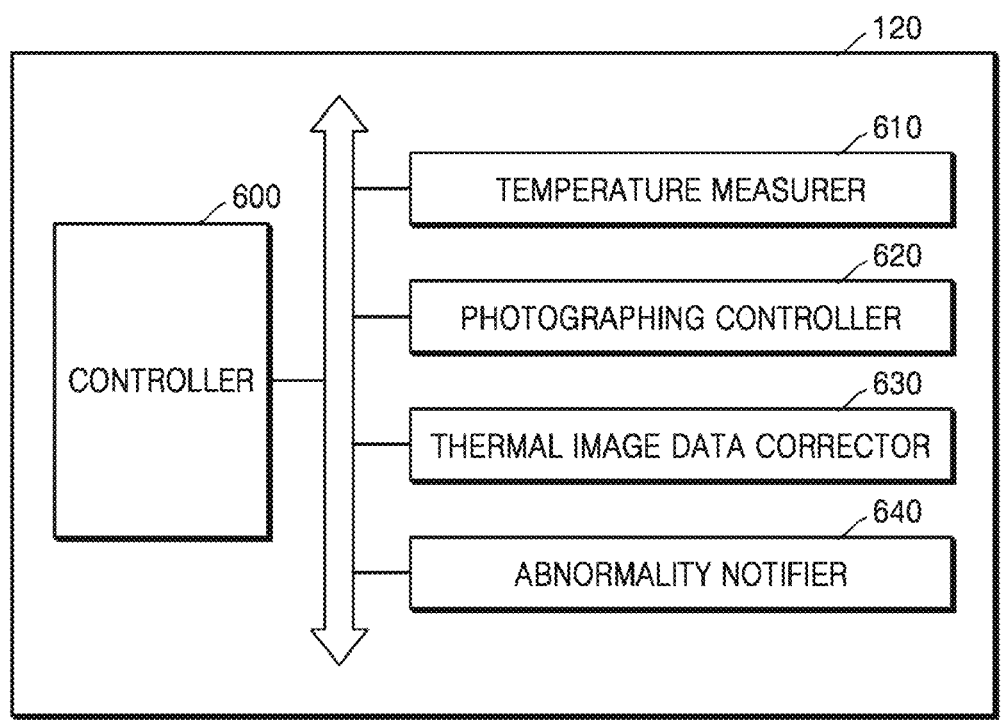
FIG. 6 is a schematic view of an inspection apparatus according to another embodiment.

FIG. 6 is a schematic view of the inspection apparatus 120 according to another embodiment.

Referring to FIG. 6, the inspection apparatus 120 may include a controller 600, a temperature measurer 610, a photographing controller 620, a thermal image data corrector 630, and an abnormality notifier 640. Furthermore, the inspection apparatus 120 may further include the display portion 121, the IR camera 122, the temperature sensor 210, and the support member 220, which are illustrated in FIGS. 1 to 3. Furthermore, although FIG. 6 illustrates that internal elements of the inspection apparatus 120 are separate from one another, the present disclosure is not limited thereto and functions of the internal elements may be integrally processed by the controller 600, a processor, or CPU.

The controller 600 controls the overall operation of the inspection apparatus 120.

The temperature measurer 610 converts data sensed by the temperature sensor 210 located within the FOV of the IR camera 122 to a temperature value. For example, the temperature measurer 610 may include an analog-to-digital (AD) converter for converting an actual temperature value sensed by the temperature sensor 210 to digital data.

The photographing controller 620 photographs the cap sealing of the container 1 located within the FOV and the temperature sensor 210 by controlling the IR camera 122.

The controller 600 calculates a surface temperature of the temperature sensor 210 from the temperature value measured by the temperature measurer 610 and the thermal image data of the temperature sensor 210 obtained by photographing the temperature sensor 210. The controller 600 compares a difference value between the measured temperature value and the calculated temperature value with a certain threshold value. The threshold value may be determined freely or according to the properties of the inspection apparatus 120. Furthermore, the threshold value may be a value between 0.01 and 5.0 in terms of Celsius temperature. Furthermore, the threshold value may be differently determined according to whether the IR camera 122 is of a cooled type or an uncooled type, the accuracy and state of calibration, and noise equivalent temperature difference (NETD).

For example, the threshold value may be set to be about 0.5 for a cooled type and about 1.0 for an uncooled type, about 1.0 for a cooled type and about 2.0 for an uncooled type, or about 0.1 for a cooled type and about 2.0 for an uncooled type.

The thermal image data corrector 630 corrects the photographed thermal image data by referring to the calibration table of the IR camera 122. Furthermore, the thermal image data corrector 630 corrects the thermal image data corresponding to the photographed cap sealing of the container 1 according to a result of the comparison by the controller 600.

The abnormality notifier 640 may issue a notification when a difference value between the temperature value measured by the temperature sensor 210 and the temperature value based on the thermal image data of the temperature sensor 210 photographed by the IR camera 122 is relatively large, an ambient temperature is rapidly changes, a current situation is inappropriate for inspection, the IR camera 122 does not work properly, or the thermal image data of the photographed cap sealing exceeds a temperature range for calibration.

Figure 7:
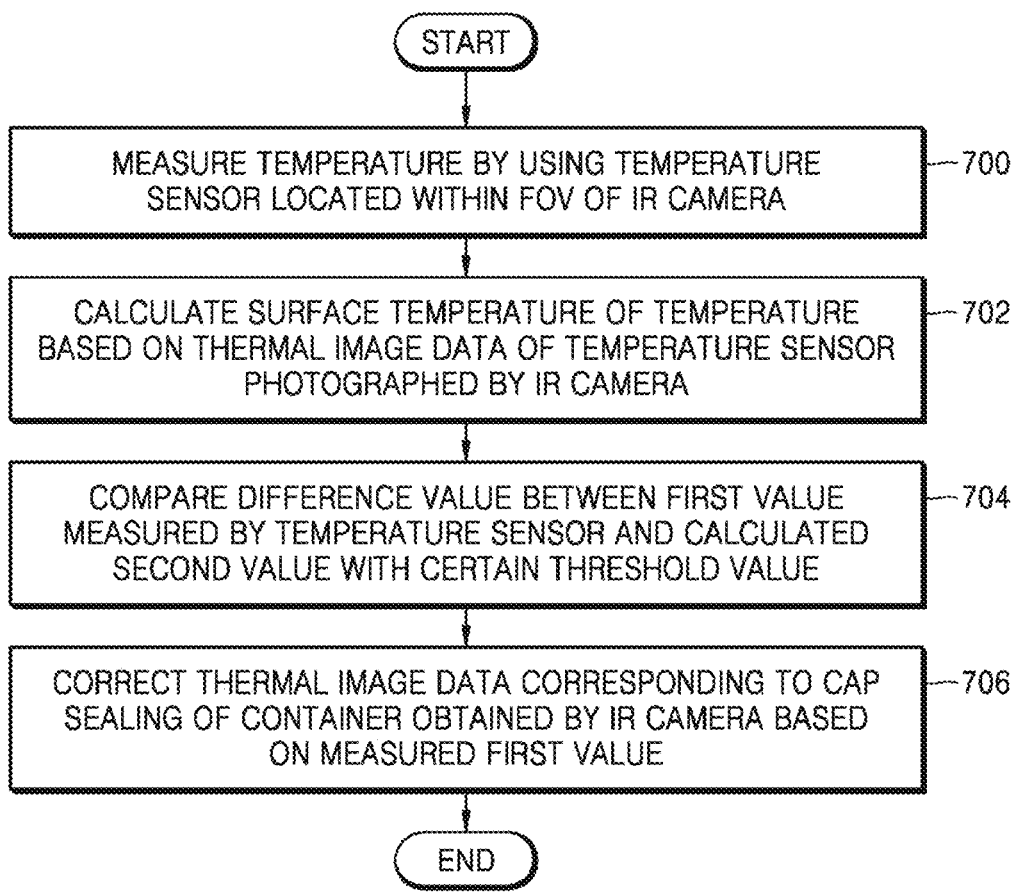
FIG. 7 is a flowchart of an inspection method according to another embodiment.

FIG. 7 is a flowchart of an inspection method according to another embodiment.

Referring to FIG. 7, in an operation 700, a temperature is measured by using a temperature sensor located within the FOV of an IR camera.

In an operation 702, a surface temperature of the temperature sensor is calculated based on thermal image data of the temperature sensor photographed by the IR camera.

In an operation 704, a difference value between a first value measured by the temperature sensor and a calculated second value is compared with a certain threshold value. The threshold value may be a value between 0.01 and 5.0 in terms of Celsius temperature. Furthermore, the threshold value may be differently determined according to whether the IR camera is of a cooled type or an uncooled type, the accuracy and state of calibration, and NETD. For example, For example, the threshold value may be about 0.5 for a cooled type and about 1.0 for an uncooled type, about 1.0 for a cooled type and about 2.0 for an uncooled type, or about 0.1 for a cooled type and about 2.0 for an uncooled type.

In an operation 706, the thermal image data corresponding to the cap sealing of a container obtained by the IR camera based on the measured first value.

In the inspection method according to an embodiment, the generation of inaccurate thermal image data according to a change in an ambient temperature of the IR camera, and an error of inspection according thereto, may be prevented, and also, the thermal image data may be corrected according to a calibration range of the IR camera. Accordingly, confidence of data in the inspection apparatus using the IR camera may be improved.

Figure 8:
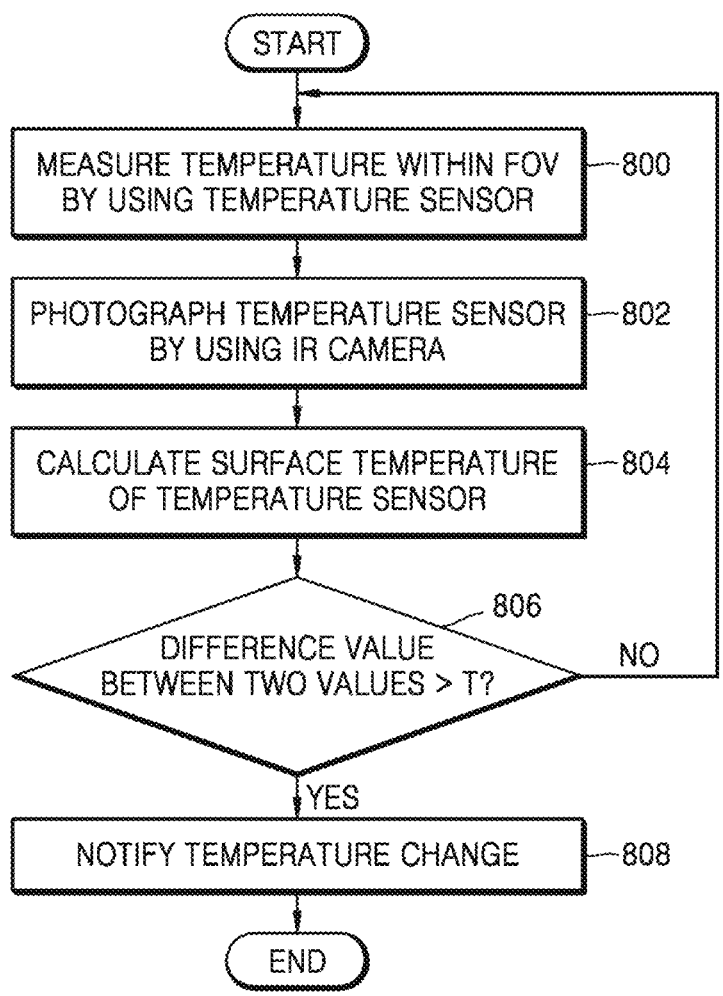
FIG. 8 is a flowchart of an inspection method according to another embodiment.

FIG. 8 is a flowchart of an inspection method according to another embodiment.

Referring to FIG. 8, in an operation 800, a temperature in the FOV of an IR camera is measured by using a temperature sensor.

In an operation 802, the temperature sensor is photographed by using the IR camera.

In an operation 804, a surface temperature of the temperature sensor is calculated.

In an operation 806, it is determined whether a difference value between the two values is greater than a threshold value T. In other words, it is determined whether a difference value between the temperature value measured in the operation 800 and the temperature value calculated in the operation 804 is greater than the threshold value T. The threshold value T may be freely determined.

When the difference value between the two values is not greater than the threshold value T as a result of the determination of the operation 806, the process returns to the operation 800.

When the difference value between the two values is greater than the threshold value T as a result of the determination of the operation 806, it is notified that there is a temperature change. For example, a user or operator may be notified that checking a camera state is necessary, through a notification of IR camera's abnormal operation or a notification of excess of a calibration temperature range.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

The present inventive concept may be described in terms of functional block components and various processing steps. Such functional blocks may be realized by any number of hardware and/or software components configured to perform the specified functions. For example, the present inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the present inventive concept are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present inventive concept could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical". It will be recognized that terms "comprising," "including," and "having," as used herein, are specifically intended to be read as open-ended terms of art.

The use of terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or language (e.g., "such as") provided herein, is intended merely to better illuminate the inventive concept and does not pose a limitation on the scope of the inventive concept unless otherwise claimed. Numerous modifications and adaptations will be readily apparent to those of ordinary skill in this art without departing from the spirit and scope of the inventive concept.

The invention claimed is:

1. A method of inspecting cap sealing of a container transferred along a process line by using an infrared (IR) camera, the method comprising:
   measuring a temperature by using a temperature sensor located within a field of view (FOV) of the IR camera;

calculating a surface temperature of the temperature sensor based on thermal image data of the temperature sensor photographed by the IR camera;

comparing a difference value between a first value measured by the temperature sensor and a second value that is calculated, with a certain threshold value;

correcting the thermal image data corresponding to the cap sealing of the container obtained by the IR camera based on the measured first value; and displaying the thermal image data obtained by photographing the cap sealing of the container and the thermal image data of the temperature sensor, wherein, when the difference value between the first value and the second value is greater than the certain threshold value, outputs (i) a notification corresponding to a temperature change, (ii) a notification indicating that a state of the IR camera is abnormal, or (iii) a notification indicating that a correction range of the IR camera is exceeded, wherein the certain threshold value is differently set according to accuracy and range of correction of the IR camera.

2. The method of claim 1, wherein the certain threshold value is differently set according to whether the IR camera is a cooled type or an uncooled type.

3. The method of claim 1, wherein the certain threshold value is differently set according to noise equivalent temperature difference of the IR camera.

4. The method of claim 1, wherein the certain threshold value is a value between 0.01 and 5.0 in terms of Celsius temperature.

5. A non-transitory computer readable storage medium having stored thereon a program, which when executed by a computer, performs the method defined in claim 1.

6. An apparatus for inspecting cap sealing of a container transferred along a process line by using an infrared (IR) camera, the apparatus comprising:

the IR camera photographing the cap sealing of the container;

a temperature sensor located within a field of view (FOV) of the IR camera and measuring a temperature;

a display portion that displays the thermal image data obtained by photographing the cap sealing of the container and the thermal image data of the temperature sensor; and a controller calculating a surface temperature of the temperature sensor based on thermal image data of the temperature sensor photographed by the IR camera, comparing a difference value between a first value measured by the temperature sensor and a second value that is calculated, with a certain threshold value, and correcting the thermal image data corresponding to the cap sealing of the container obtained by the IR camera based on the measured first value, wherein, when the difference value between the first value and the second value is greater than the certain threshold value, the controller outputs through the display portion (i) a notification corresponding to a temperature change, (ii) a notification indicating that a state of the IR camera is abnormal, or (iii) a notification indicating that a correction range of the IR camera is exceeded, wherein the certain threshold value is differently set according to accuracy and range of correction of the IR camera.

7. The apparatus of claim 6, wherein the temperature sensor is located within the FOV by being connected to a support member that extends downwardly from a position adjacent to the IR camera.

8. The apparatus of claim 6, wherein the certain threshold value is differently set according to whether the IR camera is a cooled type or an uncooled type, or noise equivalent temperature difference of the IR camera.

9. The apparatus of claim 6, wherein the certain threshold value is a value between 0.01 and 5.0 in terms of Celsius temperature.

* * * * *